E. BRAST & J. BOGER.
PADDLE-WHEEL.

No. 177,461. Patented May 16, 1876.

WITNESSES:
H. Rydquist.
John Goethals

INVENTOR:
E. Brast
J. Boger
BY
ATTORNEYS.

UNITED STATES PATENT OFFICE.

EDWARD BRAST AND JOHN BOGER, OF POWHATAN, OHIO.

IMPROVEMENT IN PADDLE-WHEELS.

Specification forming part of Letters Patent No. 177,461, dated May 16, 1876; application filed March 25, 1876.

*To all whom it may concern:*

Be it known that we, EDWARD BRAST and JOHN BOGER, of Powhatan, in the county of Belmont and State of Ohio, have invented a new and Improved Paddle-Wheel, of which the following is a specification:

The invention consists in connecting the buckets and arms of a water-wheel centrally by a yoke, angle-plate, and double angle-block, as hereinafter more particularly described.

Figure 1:
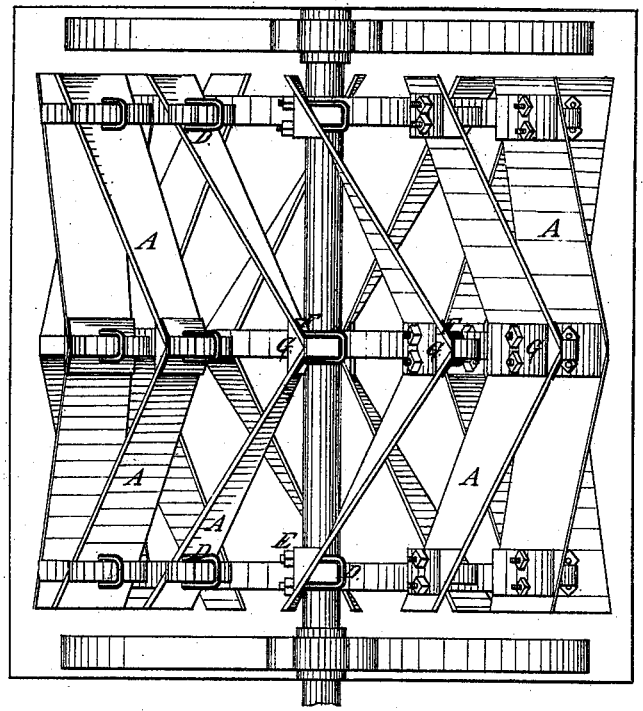
Figure 2:
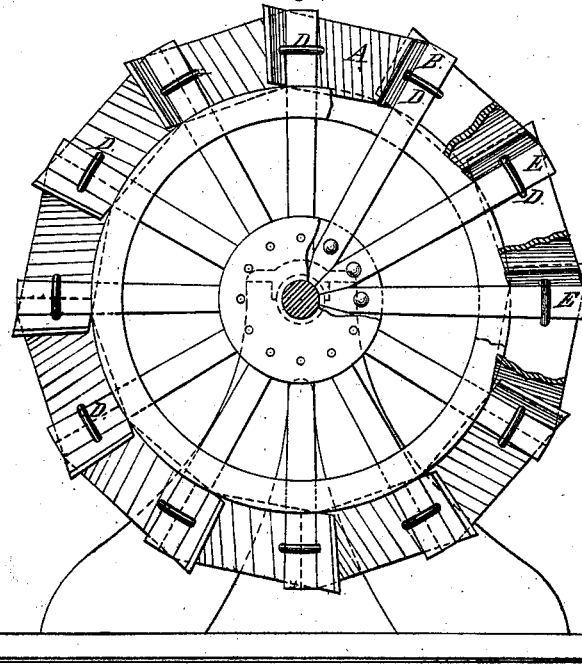

Figure 1 is a top view of our improved wheel. Fig. 2 is an end elevation with some parts in section.

Similar letters of reference indicate corresponding parts.

A represents the buckets, which incline from both ends either forward or backward relatively to the circumference of the wheel to the center, where they are connected to the next arm B, in advance of or behind the one to which they are connected at the outer end, the said paddles being either made in two parts or one. To the outer arms they are connected by a yoke, D, and a beveled block, E, and at the center they are connected by a similar yoke, but with a metal angle-plate, F, between them and the arm, and a double beveled block, G, outside, for which an angle-plate similar to F may be substituted, using bevel-washers for the nuts of the yoke.

Having thus described our invention, we claim as new and desire to secure by Letters Patent—

The buckets, connected to the arms at the center by a yoke, D, angle-plate F, and a double angle-block, G, or an angle-plate, substantially as specified.

EDWARD BRAST.
JOHN BOGER.

Witnesses:
M. M. SCOTT,
W. C. BERGUNDTHAL.